United States Patent
Kummetz et al.

(10) Patent No.: US 10,212,018 B2
(45) Date of Patent: Feb. 19, 2019

(54) MODULE FOR COMBINING SIGNALS HAVING DIFFERENT FREQUENCIES

(71) Applicant: Andrew Wireless Systems GmbH, Buchdorf (DE)

(72) Inventors: Thomas Kummetz, Kissing (DE); Peter Schmid, Marsheim-Neuhausen (DE); Alfons Dussmann, Gansheim (DE); Karl-Heinz Fackler, Wemding (DE); Roman Hofman, Prelouc (CZ)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/559,795

(22) PCT Filed: Oct. 23, 2015

(86) PCT No.: PCT/IB2015/058201
§ 371 (c)(1),
(2) Date: Sep. 19, 2017

(87) PCT Pub. No.: WO2016/151376
PCT Pub. Date: Sep. 29, 2016

(65) Prior Publication Data
US 2018/0069741 A1  Mar. 8, 2018

Related U.S. Application Data

(60) Provisional application No. 62/135,787, filed on Mar. 20, 2015.

(51) Int. Cl.
*H04B 7/02* (2018.01)
*H04B 7/12* (2006.01)
(Continued)

(52) U.S. Cl.
CPC .............. *H04L 27/28* (2013.01); *H04B 7/02* (2013.01); *H04B 7/12* (2013.01); *H04B 7/155* (2013.01); *H04L 1/04* (2013.01); *G10L 19/093* (2013.01)

(58) Field of Classification Search
USPC ....... 375/219, 220, 221, 222, 271, 259, 260, 375/295, 297, 316, 322, 326, 345, 346, (Continued)

(56) References Cited

U.S. PATENT DOCUMENTS 5,838,675 A * 11/1998 Rauscher ............... H04B 1/109
                                                                370/343
2001/0036333 A1    11/2001 Kasuga et al.
(Continued)

FOREIGN PATENT DOCUMENTS

CA    2655940 A1    12/2007
CN    1758564 A      4/2006
(Continued)

OTHER PUBLICATIONS

International Searching Authority, "International Search Report and Writteen Opinion from PCT Application No. PCT/IB2015/058201", "from PCT Application No. PCT/IB2015/058201", dated Jan. 7, 2016, pp. 1-11, Published in: WO.
(Continued)

*Primary Examiner* — Linda Wong
(74) *Attorney, Agent, or Firm* — Fogg & Powers LLC

(57) ABSTRACT

Certain features relate to a telecommunications system with a modular frequency combiner combining multiple received signals at different frequency bands without using frequency-dependent multiplexers. The frequency combiner can include adjustable tuning elements for adjusting various signal-processing parameters of the frequency combiner while the frequency combiner is in the telecommunications
(Continued)

system. For example, adjustable tuning elements can adjust the phases of phase shifters of each RF path so that the RF paths are matched for combining the received signals and outputting them through an output port. The adjustable tuning elements can also adjust the electrical length or physical length of the transmission lines that carry the received signals. The adjustable tuning elements can be adjusted manually or automatically while the frequency combiner is deployed in the field in the telecommunications system.

20 Claims, 6 Drawing Sheets

(51) Int. Cl.
*H04L 1/04* (2006.01)
*H04L 27/28* (2006.01)
*H04B 7/155* (2006.01)
*G10L 19/093* (2013.01)

(58) Field of Classification Search
USPC .................. 375/344, 362, 299, 304, 315
See application file for complete search history.

(56) References Cited

U.S. PATENT DOCUMENTS

| | | | | |
|---|---|---|---|---|
| 2003/0107517 A1* | 6/2003 | Ikeda | .................. | H04B 7/084 342/372 |
| 2006/0189282 A1* | 8/2006 | Hasegawa | ........... | H04L 27/2614 455/127.1 |
| 2006/0229077 A1* | 10/2006 | Monk | .................. | H01Q 1/283 455/442 |
| 2007/0241814 A1* | 10/2007 | Kayano | .................. | H03F 3/68 330/126 |
| 2008/0107093 A1* | 5/2008 | Meiyappan | .......... | H04B 1/1036 370/339 |
| 2009/0096525 A1* | 4/2009 | Staszewski | ............. | H03F 3/189 330/277 |
| 2009/0313528 A1* | 12/2009 | Chugg | .................. | H04B 7/026 714/758 |
| 2011/0249831 A1* | 10/2011 | Bellamy | .............. | H04B 7/0874 381/94.1 |
| 2012/0176195 A1* | 7/2012 | Dawson | ................. | H03F 1/0244 330/124 R |
| 2012/0219085 A1* | 8/2012 | Long | ....................... | H04L 25/14 375/295 |
| 2013/0109325 A1* | 5/2013 | Afsahi | ................. | H04B 7/0689 455/73 |
| 2013/0322309 A1* | 12/2013 | Smith | ....................... | H04L 5/14 370/281 |
| 2014/0002186 A1* | 1/2014 | Kawasaki | ............. | H03F 1/3252 330/124 R |
| 2014/0010124 A1* | 1/2014 | Kumamoto | ............... | H04L 5/18 370/278 |
| 2014/0098902 A1* | 4/2014 | Harel | ..................... | H04B 7/086 375/267 |
| 2014/0105256 A1* | 4/2014 | Hanevich | ............... | H04B 1/001 375/219 |
| 2014/0118063 A1* | 5/2014 | Briffa | ........................ | H03F 1/32 330/124 R |
| 2014/0335805 A1* | 11/2014 | Briffa | ................... | H03G 3/3042 455/127.3 |
| 2015/0103952 A1* | 4/2015 | Wang | ..................... | H04L 27/368 375/297 |
| 2015/0115729 A1* | 4/2015 | Kanno | .................... | H01F 38/14 307/104 |
| 2015/0249444 A1* | 9/2015 | Shin | ........................ | H03F 3/211 327/161 |
| 2015/0295636 A1* | 10/2015 | Fujimura | ............... | H04B 17/40 370/315 |
| 2016/0013855 A1* | 1/2016 | Campos | ................. | H04B 7/12 370/343 |
| 2016/0191003 A1* | 6/2016 | Yamanouchi | .......... | H04B 1/005 330/295 |

FOREIGN PATENT DOCUMENTS

| | | |
|---|---|---|
| CN | 1917377 A | 2/2007 |
| CN | 101859920 A | 10/2010 |
| CN | 201752030 U | 2/2011 |
| EP | 1318618 A2 | 6/2003 |
| EP | 1646160 | 4/2006 |
| EP | 2683024 A1 | 1/2014 |
| JP | 2001305439 A | 10/2001 |
| JP | 2006293215 | 10/2006 |

OTHER PUBLICATIONS

State Intellectual Property Office, People'S Republic of China, "First Office Action from CN Application No. 201580075460.3 dated Sep. 30, 2018" From Foreign Counterpart of U.S. Appl. No. 15/559,795; pp. 1-17; Published in CN.

* cited by examiner

MODULE FOR COMBINING SIGNALS HAVING DIFFERENT FREQUENCIES

CROSS-REFERENCE TO RELATED APPLICATIONS

This application is a U.S. National Stage application of PCT Application Serial No. PCT/IB2015/058201, filed 23 Oct. 2015 and titled "Module For Combining Signals Having Different Frequencies," which claims the benefit of U.S. Provisional Application Ser. No. 62/135,787, filed Mar. 20, 2015 and titled "Modular Phase Combiner," the contents of all of which are hereby incorporated by reference.

TECHNICAL FIELD

The disclosure relates generally to telecommunications and, more particularly (although not necessarily exclusively), to a frequency combiner for adjusting signal-processing parameters and combining signals of multiple frequency bands.

BACKGROUND

In a telecommunications system, such as a distributed antenna system (DAS) or a repeater installation, multiple frequency bands can be wirelessly received via one or more antennas. A DAS or a repeater installation can be used to extend wireless coverage in an area. For example, a repeater can receive multiple frequency bands from a base station wirelessly from one or more donor antennas. After amplification to a desired output power, individual transmit and receive paths can be combined using a frequency combiner. The combined signal can be output via one or more RF ports to serve a coverage area. But, a frequency dependent frequency combiner can involve insertion loss and lack flexibility when a frequency band unsupported by the frequency combiner is used.

In a telecommunications system such as a DAS, a repeater, or a small cell, one or more head-end units can receive downlink signals on multiple frequency bands from one or more base stations. The head-end unit can distribute the downlink signals in analog or digital format to one or more remote units. The individual transmit paths can be combined in a multiplexer in a remote unit and output from one or more RF ports to serve a coverage area. But, a frequency dependent multiplexer can lack flexibility when a frequency band unsupported by the multiplexer is used.

SUMMARY

In one aspect, a telecommunications system is provided. The telecommunications system can include input ports configured for receiving signals at different frequencies. The telecommunications system can also include at least one output port configured for outputting the signals. The telecommunications system can also include a frequency combiner communicatively coupled between the input ports and the at least one output port. The frequency combiner includes adjustable tuning elements, each adjustable tuning element configured to adjust a signal-processing parameter of the frequency combiner while the frequency combiner is in the telecommunications system.

In another aspect, a remote unit of a distributed antenna system is provided. The remote unit is configured to provide wireless communication from a head-end unit to one or more user equipment devices. The remote unit can include a frequency combiner. The frequency combiner includes input ports for receiving signals at different frequencies from the head-end unit. The frequency combiner also includes at least one output port for outputting the signals to the one or more user equipment devices. The frequency combiner also includes a combiner component communicatively coupled between the input ports and the at least one output port. The combiner component includes adjustable tuning elements, each adjustable tuning element being configured to adjust a signal-processing parameter of the frequency combiner while the frequency combiner is in the remote unit.

In another aspect, a method is provided. The method can include receiving multiple signals at different frequencies. The method can also include adjusting signal-processing parameters of a frequency combiner positioned between multiple input ports and an output port of a telecommunications system. The signal processing parameters can be adjusted using adjustable tuning elements while the frequency combiner is in the telecommunications system. The method also includes outputting the signals.

DETAILED DESCRIPTION

Figure 1:
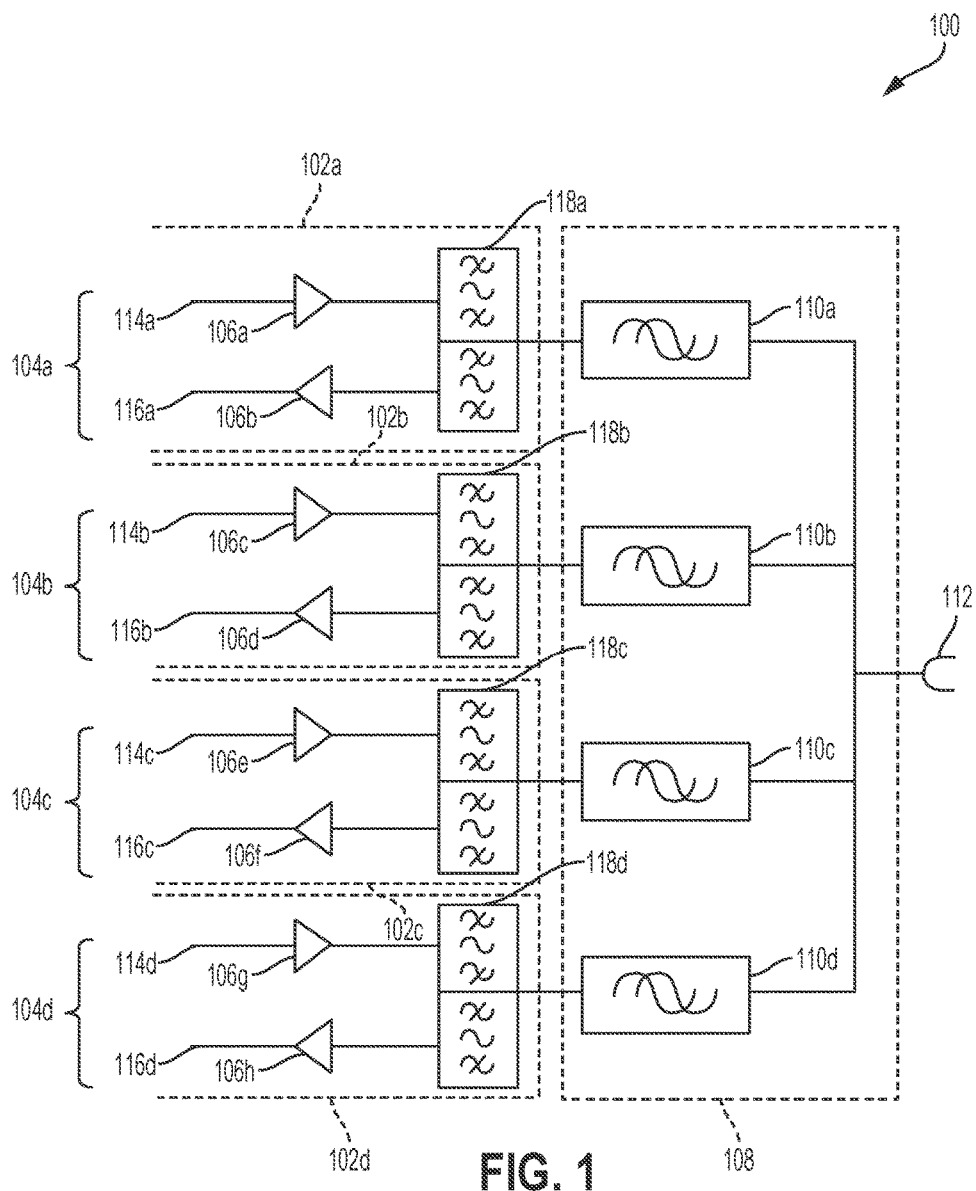
FIG. 1 is a block diagram of an example of a frequency combiner according to one aspect of the present disclosure.

Certain aspects and features are directed to a telecommunications system with a frequency combiner that includes adjustable tuning elements for adjusting signal-processing parameters of the frequency combiner while the frequency combiner is in the telecommunications system. For example, a frequency combiner can include input ports that receive multiple signals at different frequencies. The frequency combiner can include adjustable tuning elements for adjusting the phase shifts of the multiple RF paths using phase shifters. The frequency combiner can be frequency independent (e.g., configured to receive and combine signals at any frequency) so that multiple RF modules that each support different frequency bands can be used and adjusted. By adjusting the phase shift of the RF path for each RF module, the frequency combiner can ensure that the RF modules are matched at the output ports. In other aspects, the adjustable tuning elements of the frequency combiner can include an electric length tuner for changing a relative permittivity of the transmission line or a tuning line for varying the physical length of the transmission line. The frequency combiner can be field-configurable and adjustable while implemented in the telecommunications system.

In one example, a distributed antenna system (DAS), repeater, or other telecommunications system can include multiple input ports that are each frequency specific. The telecommunications system can also include one or more output ports. The telecommunications system can include a frequency combiner for combining the multiple input signals for output through the one or more output ports. Adjusting signaling parameters of the frequency combiner can ensure that the phase shifts and other parameters of the multiple RF paths are matched together in the telecommunications system. The adjustable elements of the frequency combiner can be tuned manually or automatically so that RF modules with different input frequencies can be swapped in the telecommunications system while in the field. Further, adjustable tuning elements can provide for low passive intermodulation (PIM) to avoid desensitizing the receive path by PIM products created in the transmit path.

The use of a frequency combiner with adjustable tuning elements can allow for combining input signals of varying frequencies in a telecommunications system while reducing the total number of required frequency-dependent multiplexers. Further, use of a frequency combiner with adjustable elements can offer the flexibility to upgrade and exchange frequency bands in field installations.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions may be used to describe the illustrative aspects but, like the illustrative aspects, should not be used to limit the present disclosure.

FIG. 1 is a block diagram of an example of a frequency combiner 100 for use in a telecommunications system, such as a DAS or a repeater. The frequency combiner 100 can be positioned between multiple input ports and at least one output port of the telecommunications system. The frequency combiner can include one or more RF modules 102a-d communicatively coupled to a combiner component 108. The combiner component 108 can include circuitry for adjusting signal-processing parameters of the RF paths for combining the signals of the RF modules 102a-d. The combiner component 108 can combine signals of varying frequencies. The frequency combiner 100 can be frequency independent while the RF modules 102a-d can be frequency dependent (e.g., each tuned to a specific frequency band). The RF modules 102a-d can each include input ports 104a-d. The input ports 104a-d can respectively include receive (RX) ports 114a-d for receiving RF signals and transmit (TX) ports 116a-d for transmitting RF signals. Each of the RX ports 114a-d and the TX ports 116a-d can be tuned to a different frequency band. As the frequency combiner 100 can be frequency independent, RF modules 102a-d can be exchanged while the frequency combiner 100 is deployed in a telecommunications system to support different frequencies.

For example, RF module 102a can include RX port 114a designed to receive signals at frequencies between 925 MHz-960 MHz and TX port 116a designed to transmit signals between 880 MHz-915 MHz. Similarly, RF module 102b can include RX port 114b designed to receive signals at frequencies between 791 MHz-821 MHz and TX port 116b designed to transmit signals between 832 MHz-862 MHz. RF module 102c can include RX port 114c designed to receive signals at frequencies between 1805 MHz-1880 MHz and TX port 116c designed to transmit signals between 1710 MHz-1785 MHz. RF module 102d can include RX port 114d designed to receive signals at frequencies between 2620 MHz-2690 MHz and TX port 116d designed to transmit signals at frequencies between 2500 MHz-2570 MHz. A new frequency range can be used within the frequency combiner 100 by swapping an RF module 102 with a new module that supports an RX port for receiving signals at frequencies between 2110 MHz-2170 MHz and a TX port for transmitting signals at frequencies between 1920 MHz-1980 MHz.

Each RF module 102a-d can include amplifiers 106a-h for increasing the gain of signals received on RX ports 114a-d and transmitted on TX ports 116a-d. The RF modules 102a-d can be communicatively coupled to a combiner component 108 via duplexers 118a-d. Duplexers 118a-d can be used to provide bidirectional communication with the combiner component 108. For example, the duplexer 118a allows signals received on RX port 114a and signals transmitted on TX port 116a to share the communications path with the combiner component 108. The combiner component 108 can include adjustable tuning elements 110a-d. Test signals from each of the RF modules 102a-d can be provided to the combiner component 108 so that by adjusting of certain signal-processing parameters at the respective adjustable tuning elements 110a-d the RF paths can be optimized for combining signals. For example, the adjusting tuning elements 110a-d can include phase shifters for adjusting the phase shift of each RF path in the combiner component 108, electric length tuners for changing the relative permittivity of the transmission lines of the RF paths in the combiner component 108, or a tuning line varying the physical length of each transmission line used by the combiner component 108. For example, tuning lines can be used for combining signals in starpoint or manifold combiners, where cables between filters are dimensioned with the correct electrical length to each other. After adjusting the signal-processing parameters of the frequency combiner 100, the signals of each RF module 102a-d can be combined before being communicated through an output port 112.

The adjustable tuning elements 110a-d may be electrically, automatically, or manually adjustable. For example, the tuning element can be controlled by an electric voltage or current. Possible adjustable tuning elements 110a-d that can be electrically controlled are micro-electromechanical systems (MEMS) elements, varactor diodes, variable capacitors, and others. The voltage or current can be changed by a controller. The controller can perform the changes automatically following an algorithm that uses input from the analysis of the combiner component 108 output. As an example, the controller algorithm can optimize the tuning elements and thus maximize the RF output power.

The adjustable tuning elements 110a-d can also include screws, handles, wheels, or other tools for manual adjustment. The adjustable tuning elements 110a-d can also be coupled and driven by a motor or engine for automatic adjustment. When being adjusted manually, the adjustable tuning elements 110a-d can each be marked per module band in a way to identify to a user how to adjust the adjustable tuning element. For example, an adjustable tuning element 110 can include a first marking indicating the required adjustments for a first a desired TX frequency and a second marking indicating required adjustments for a second desired TX frequency.

Figure 2:
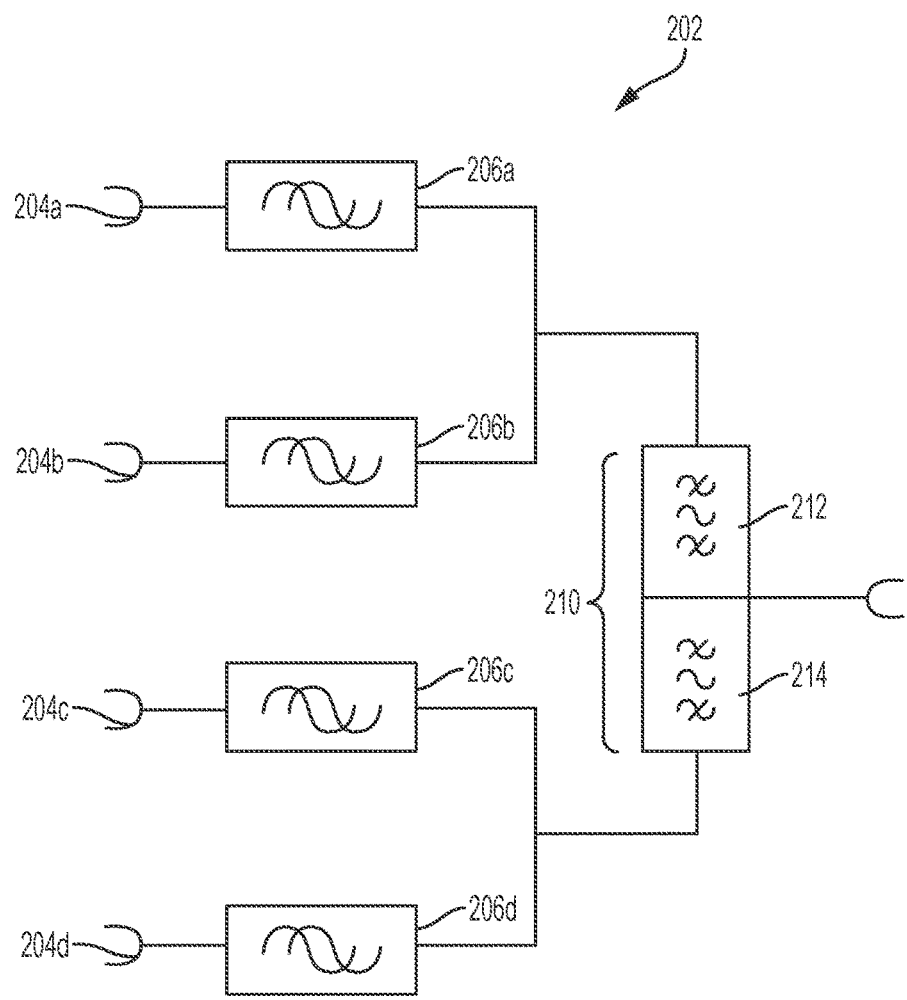
FIG. 2 is a block diagram of an example of a frequency combiner followed by a low/high band combiner according to one aspect of the present disclosure.

In some aspects, the supported bandwidth of some ports of the frequency combiner 100 may be limited. In this aspect, a frequency combiner 100 can include filters for limiting the frequencies of the individual ports into a low band and a high band. FIG. 2 is a block diagram that depicts an example of a frequency combiner 202 followed by a low/high band combiner 210. Frequency combiner 202 can include input ports 204a-d, each of which can carry TX signals or RX signals of different frequencies. Signal-processing parameters (e.g., phase shifts) can be adjusted at respective adjustable tuning elements 206a-d (e.g., phase shifters), as described above with respect to FIG. 1. The adjustable tuning elements 206a-d can be communicatively coupled to the low/high band combiner 210. The low/high band combiner 210 can include a low pass filter 212 communicatively coupled to the outputs of adjustable tuning elements 206a-b. The low pass filter 212 filters and outputs signals below a certain threshold frequency. Similarly, the low/high band combiner 210 can also include a high pass filter 214 communicatively coupled to the outputs of adjustable tuning elements 206c-d. The high pass filter 214 filters and outputs signals above a certain threshold frequency. The frequency combiner 202 with the low/high band combiner 210 can output adjusted signals below a certain threshold frequency and adjusted signals above a certain threshold frequency.

Figure 3:
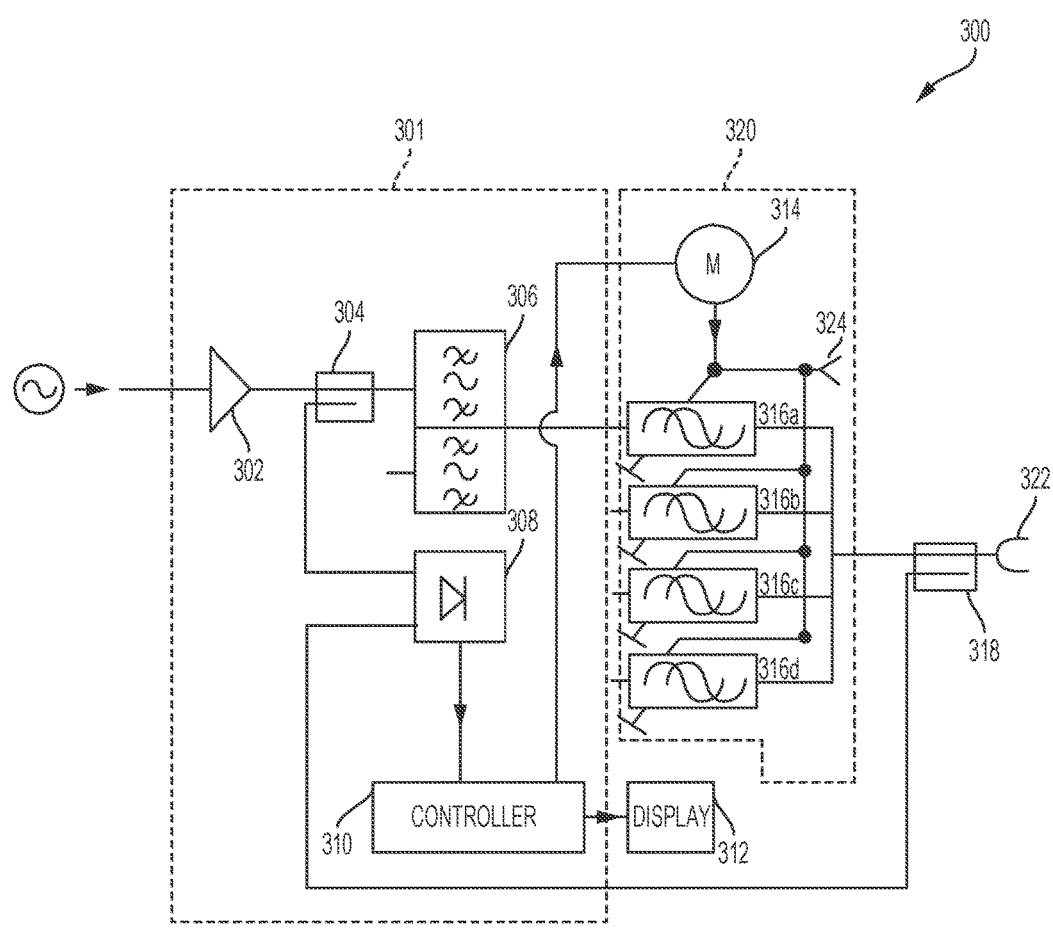
FIG. 3 is a block diagram of an example of a frequency combiner with power detection components according to one aspect of the present disclosure.

In some aspects, each RF module 102a-d of frequency combiner 100 (shown in FIG. 1) can include components for detecting the power difference between the signals output from the combiner component 108 with the signals input into the combiner component 108. The adjustable tuning elements 110a-d of the frequency combiner 100 can be tuned so that the difference in power is minimized. FIG. 3 is a circuit diagram depicting an example of an RF module 301 of a frequency combiner 300 that includes circuitry for power detection and control.

The RF module 301 can include an amplifier 302 for increasing the power of signals input into the RF module 301. The amplified signal can be provided to a pre-RF coupler 304, which directs the amplified signal to a duplexer 306 and a power detector component 308. The amplified signal can be provided through the duplexer 306 to a combiner component 320 as discussed above with respect to FIG. 1. Adjustable tuning elements 316a-d can adjust signal processing parameters such that the RF path of the amplified signal is optimized for combining with signals from other RF modules (not shown). The combined signal can be provided to a post-RF coupler 318, which can provide the combined signal to output port 322 and to an input of the power detector component 308. The power detector component 308 can thus receive as inputs the signal inputted into the combiner component 320 and the combined signal output from the combiner component 320.

By using a frequency combiner 300 with a power detector component 308 in a telecommunications system, a calibration process can be started within the telecommunication system to adjust the signal-processing parameters accordingly. For example, a tone injection signal (e.g., a test signal) can be provided through the amplifier 302 towards the duplexer 306 and the power detector component 308. The tone injection signal can include continuous-wave (CW) tones per RF module band. The CW tones can be part of the TX passband of the respective RF modules, which produce a certain output power.

The power detector component 308 of the RF module 301 can determine a difference in power between the signal inputted into the combiner component 320 (e.g., the CW tone injection signal) and the signal outputted by the combiner component 320. Each RF module 301 within the frequency combiner can include similar circuitry with a power detector component for comparing the difference of power levels between the signals input into the combiner component 320 with the combined signal output from the combiner component 320. Each power detector component 308 can provide the difference in power level to a controller 310. The difference in power level for each RF module 301 can also be displayed on a display device 312. The controller 310 can be coupled to a motor 314 or other automatic tuning element and electronically steer the motor 314 to automatically tune the adjustable tuning elements 316a-d. The controller 310, with the use of the motor 314, can automatically tune the signal processing parameters of the adjustable tuning elements 316a-d until the difference in power between signals input into the combiner component 320 and signals output from the combiner component 320 is minimized and optimized. By adjusting the differences in power to a minimum, the adjustable tuning elements 316a-d can be calibrated to the required needs.

The adjustable tuning elements 316a-d can also include a manual input 324 for adjusting the signal-processing parameters of the adjustable tuning elements 316a-d, as discussed above for FIG. 1. For example, a user can manually adjust the parameters of the adjustable tuning elements 316a-d until the display device 312 indicates a minimal difference in power between the input signals and output signals. In some aspects, the display device 312 can present a user interface that can receive inputs from a user. For example, the user interface on the display device 312 can receive inputs for manually adjusting and tuning the adjustable tuning elements 316a-d.

Figure 4:
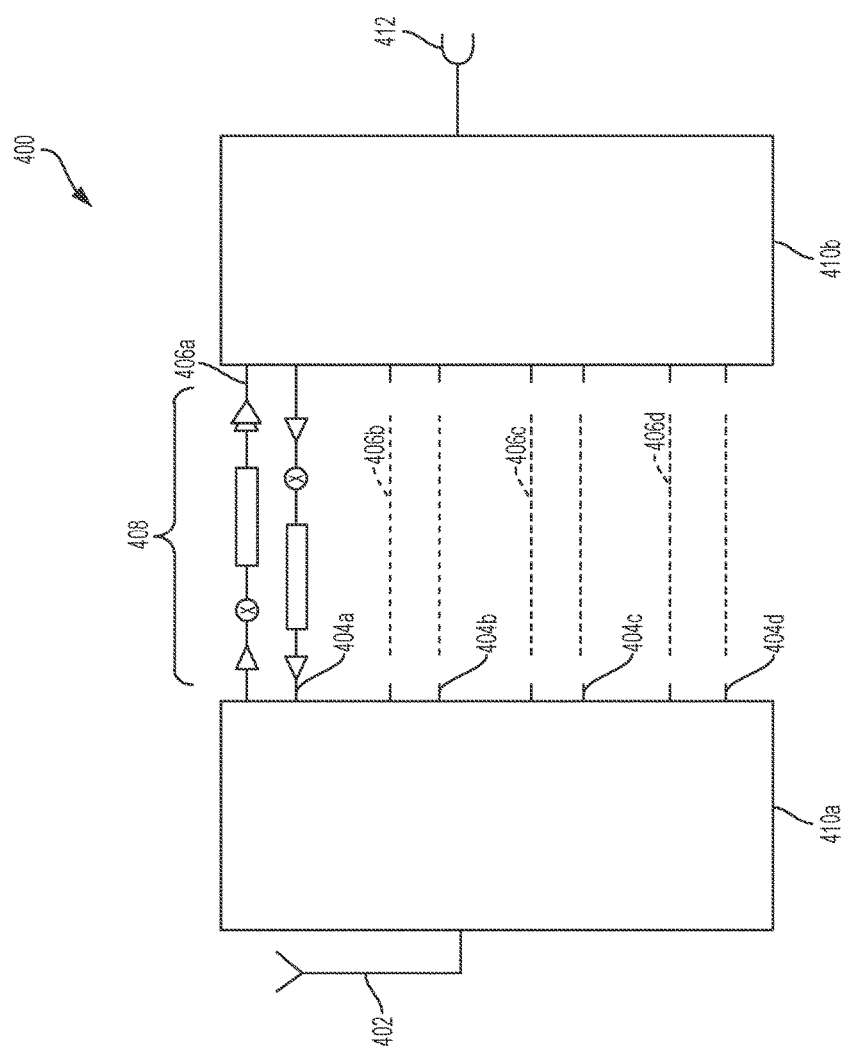
FIG. 4 is a block diagram of frequency combiners implemented in a repeater according to one aspect of the present disclosure.

The frequency combiners 100, 202, 300 can be implemented in a telecommunications system, such as a repeater or a DAS. For example, FIG. 4 is a block diagram of an example of a repeater 400 with a frequency combiners 410a-b for combining and splitting multiple signals of varying frequencies. Multiple frequency bands can be received from base stations (not shown) wirelessly via one or more donor antennas 402. The multiple frequencies can be split into separate frequency bands and separated into transmit (TX) paths 404a-d and receive (RX) paths 406a-d using frequency combiner 410a. Each of the separate TX paths 404a-d and RX paths 406a-d can carry signals on separate frequency bands. After extracting the separate TX paths 404a-d and RX paths 406a-d, signal-processing components 408 can amplify signals on the TX paths 404a-d and RX paths 406a-d to a desired output power. Signal-processing components 408 can include, for example, analog RF components or digital signal-processing components. After a final amplification to a desired output power, the individual TX paths 404a-d and RX paths 406a-d can be combined using frequency combiner 410b. The resulting combined output signal can be transmitted via one or more output ports 412 to one or more antennas or radiating cables (not shown) in order to provide signal coverage to user equipment devices positioned within the coverage zone.

Figure 5:
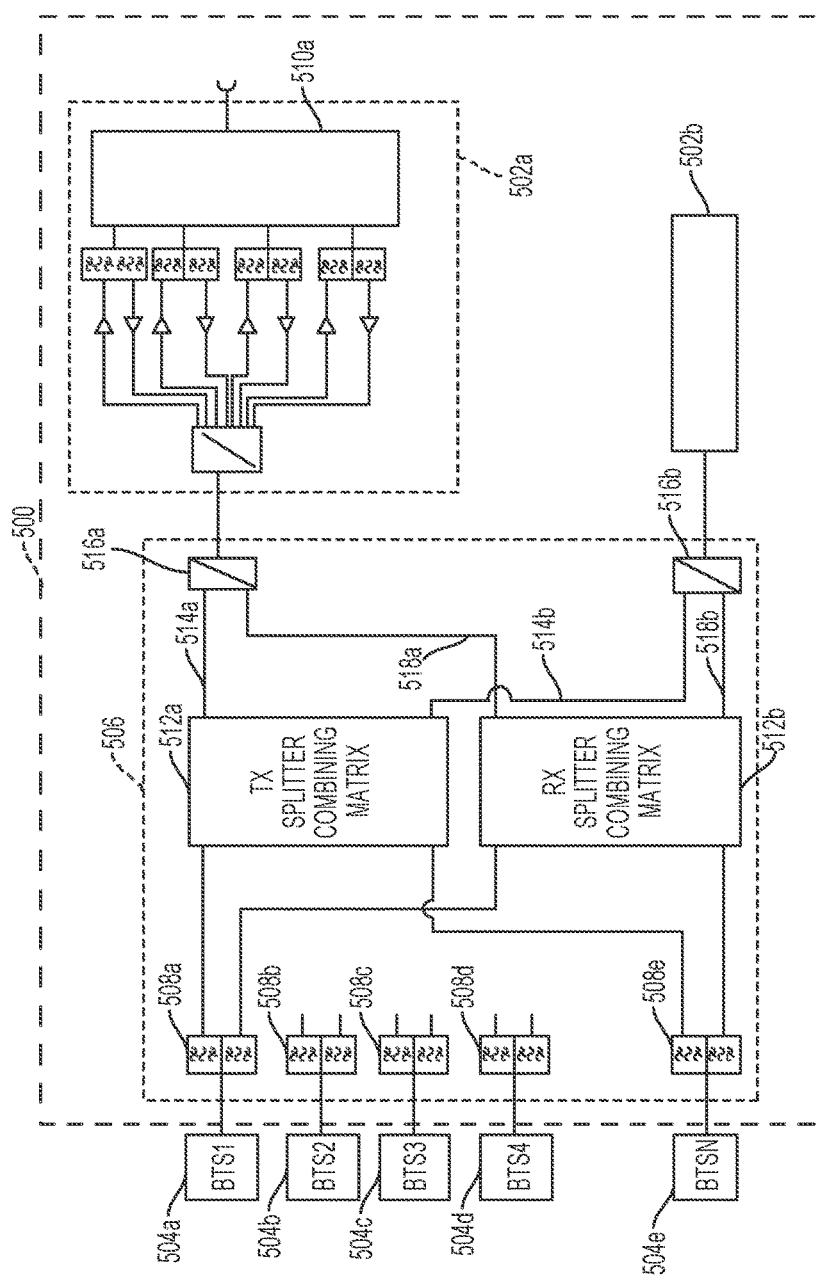
FIG. 5 is a block diagram of a frequency combiner implemented in a distributed antenna system according to one aspect of the present disclosure.

Similarly, frequency combiners 100, 202, 300 can be implemented in a DAS. FIG. 5 depicts an example of frequency combiners 510a-b implemented in a DAS 500. Specifically, DAS 500 can include remote units 502a-b that include frequency combiners 510a-b according to aspects discussed herein. The remote units 502a-b can provide signal coverage to user equipment devices positioned within respective coverage zones. The remote units 502a-b can communicate with base stations 504a-e via a head-end unit 506. Remote units 502a-b can be communicatively coupled with head-end unit 506 via a direct wired connection or a wireless connection. For example, remote units 502a-b can be communicatively coupled with head-end unit via copper cables, optical fiber, or a wireless communication medium. While FIG. 5 depicts DAS 500 with a single head-end unit 506, the DAS 500 can also include multiple head-end units.

The head-end unit 506 can receive downlink signals from base stations 504a-e and transmit uplink signals to the base stations 504a-e. Any suitable communication link can be used for communication between the base stations 504a-e and the head-end unit 506. For example, the base stations 504a-e and the head-end unit 506 can be communicatively coupled using a direct connection (e.g., copper cable or optical fiber) or a wireless communication medium. In some aspects, the head-end unit 506 can include an external repeater or internal RF transceiver to communicate with base stations 504a-e.

Base stations 504a-e can communicate signals on multiple frequencies and on different operators with head-end unit 506. The head-end unit 506 can include duplexers 508a-e for providing bi-directional communication with base stations 504a-e. For example, downlink signals from base station 504a can be separated from uplink signals to base station 504a via duplexer 508a. The downlink signals from base stations 504a-e can be provided to a splitting/combining matrix 512a. Splitting/combining matrix 512a can combine the downlink signals from base stations 504a-e to the appropriate downlink paths 514a-b intended for the respective remote units 502a-b. Downlink signals on downlink paths 514a-b can then be provided to optical transceivers 516a-b and then transmitted to remote units 502a-b. Thus, downlink signals from base stations 504a-e that are intended for remote unit 502a can be combined via splitting/combining matrix 512a and transmitted to remote unit 502a. Similarly, downlink signals from base stations 504a-e that are intended for remote unit 502b can be combined via splitting/combining matrix 512a and transmitted to remote unit 502b. The downlink signals transmitted to remote units 502a-b can include signals on multiple frequencies (e.g., each base station 504a-e can transmit downlink signals on a respectively different frequency band).

The remote units 502a-b can include frequency combiners 510a-b according to aspects described herein. The frequency combiners 510a-b can include adjustable tuning elements 110a-d (shown in FIG. 1) for adjusting the signal-processing parameters of the frequency combiners 510a-b. For example, adjustable tuning elements 110a-d can adjust the phase shift of each downlink RF path to ensure that the downlink RF paths are matched optimally for combining the downlink signals and outputting the downlink signals from the remote units 502a-b. Implementing frequency combiners 510a-b in remote units 502a-b can allow the DAS 500 to support new frequency bands from base stations 504a-e.

Uplink signals transmitted by user equipment devices can be received by remote units 502a-b. The remote units 502a-b can separate the uplink signals received from user equipment devices via frequency combiners 510a-b and transmit the separated uplink signals to head-end unit 506. The uplink signals from each remote unit 502a-b can be respectively provided to optical transceivers 516a-b, which can be used for bi-directional communication between head-end unit 506 and remote units 502a-b. The uplink signals can be provided on uplink paths 518a-b to splitting/combining matrix 512b. The splitting/combining matrix 512b can split the uplink signals from each remote unit 502a-b for transmittal to the appropriate base stations 504a-e. For example, uplink signals from remote unit 502a may include combined signals on multiple frequency bands, signals on each frequency band intended for a respective base station 504a-e. Splitting/combining matrix 512b can split the uplink signals according to frequency band and direct the split uplink signals to the correct base stations 504a-e. The uplink signals can be provided to duplexers 508a-e and output to base stations 504a-e.

While FIGS. 4 and 5 depict block diagrams of frequency combiners being implemented in a repeater and a DAS, respectively, frequency combiners can be included in any telecommunications system.

Figure 6:
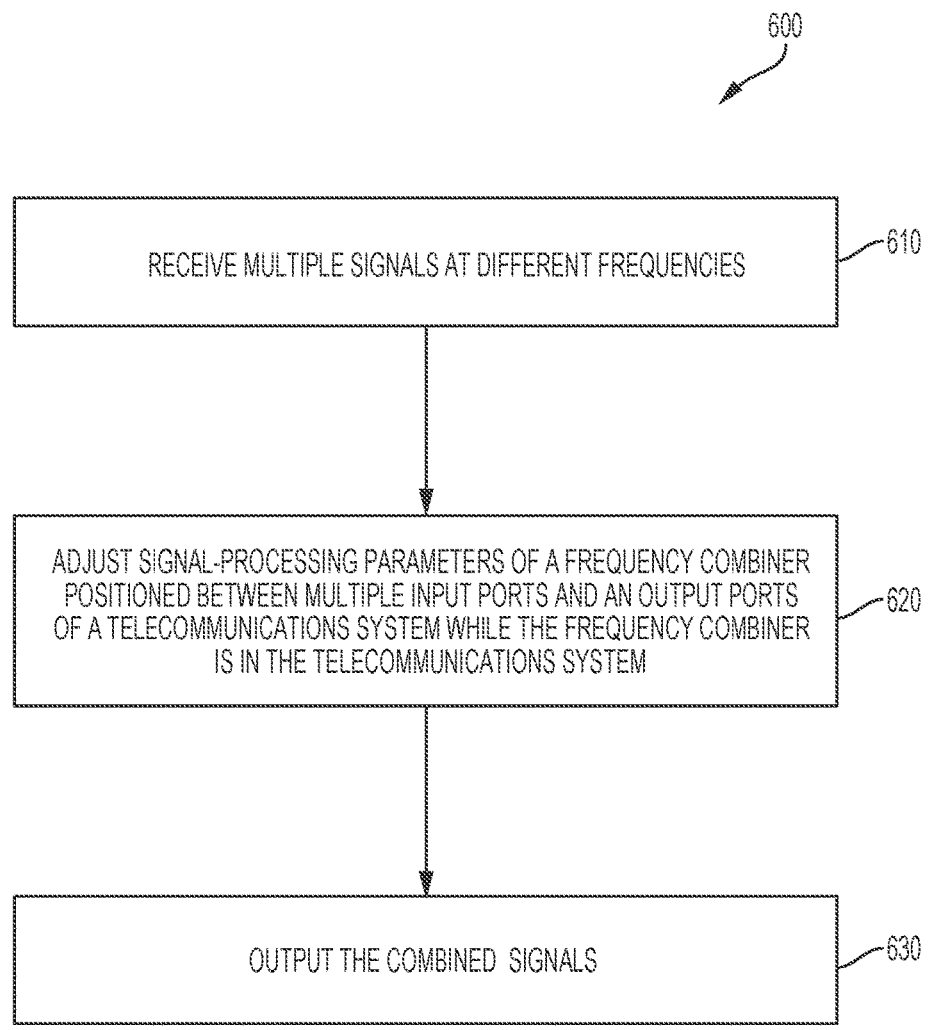
FIG. 6 is a flowchart depicting an example of a process for adjusting signal-processing parameters and combining multiple signals of different frequency bands according to one aspect of the present disclosure.

FIG. 6 is a flowchart depicting an example process 600 for combining separate frequency bands using a frequency combiner. The process 600 is described with respect to the system depicted in FIG. 1. Other implementations, however, are possible. Process 600 can include receiving signals at different frequencies, as shown in block 610. For example, as discussed above with respect to FIG. 1, a frequency combiner 100 can include RF modules 102a-d, each RF module 102a-d tuned to receive and transmit signals on a different frequency band. The frequency combiner can receive signals on different frequencies via RF modules 102a-d.

Process 600 can further include adjusting signal-processing parameters of a frequency combiner positioned between multiple input ports and an output port of a telecommunications system while the frequency combiner is in the telecommunications system, as shown in block 620. For example, frequency combiner 100 can include a combiner component 108 with adjustable tuning elements 110a-d. The frequency combiner 100 can be positioned between input ports 104a-d that receive multiple signals on different frequencies and at least one output port 112. Signals received on each of the input ports 104a-d can be provided to RF modules 102a-d. Signals from RF modules 102a-d can be provided to adjustable tuning elements 110a-d. The signal-processing parameters of the frequency combiner 100 can be adjusted by automatically or manually adjusting adjustable tuning elements 110a-d. For example, adjustable tuning elements 110a-d can adjust the phases of phase shifters, adjust the relative permittivity of electrical length tuners or vary the physical length of transmission lines. Thereby the phase shift of each RF path can be adjusted. The phase-matched RF paths allow for combining the multiple received signals in the combiner component 108 without the use of frequency-dependent multiplexers.

The signal-processing parameters of frequency combiner can be adjusted while the frequency combiner 100 is in a telecommunications system. For example, the adjustable tuning elements 102a-d can be adjusted while the frequency combiner 100 is already deployed in the field within a telecommunications system, such as a DAS or a repeater. The signal-processing parameter can include phase shifting or varying the electrical length of a transmission line. Further, the frequency bands utilized by the telecommunications system can be upgraded while the telecommunications system is deployed in the field by exchanging the RF modules 102a-d as described above with respect to FIG. 1.

Process 600 can also include outputting the combined signals, as shown in block 630. For example, after adjusting the RF paths and combining the received signals, the frequency combiner 100 can output the signals via an output port 112. In one aspect, the frequency combiner 100 can be included in a repeater unit 400 and the signals output to one or more remote units in communication with the repeater unit 400. In another aspect, the frequency combiner 100 can be included in a remote unit 502 and the signals output to one or more user equipment devices within a coverage zone of the remote unit 502.

The foregoing description of the examples, including illustrated examples, of the disclosed subject matter has been presented only for the purpose of illustration and description and is not intended to be exhaustive or to limit the subject matter to the precise forms disclosed. Numerous modifications, adaptations, and uses thereof can be apparent to those skilled in the art without departing from the scope of this subject matter. The illustrative examples described above are given to introduce the reader to the general subject matter discussed here and are not intended to limit the scope of the disclosed concepts.

What is claimed is:

1. A telecommunications system, comprising:
   input ports configured to receive signals at different frequencies;
   at least one output port configured to output the signals; and
   a frequency combiner communicatively coupled between the input ports and the at least one output port, the frequency combiner having a plurality of RF modules communicatively coupled to the input ports, each of the plurality of RF modules comprising a detector with circuitry for determining differences in power level between input signals to the frequency combiner and output signals from the frequency combiner, the frequency combiner having adjustable tuning elements, each adjustable tuning element being configured to adjust a signal-processing parameter of the frequency combiner while the frequency combiner is in the telecommunications system.

2. The telecommunications system of claim 1, wherein the signal-processing parameter comprises phase shifting or varying an electrical length of a transmission line, wherein the telecommunications system is a repeater or a distributed antenna system.

3. The telecommunications system of claim 1, wherein the frequency combiner is frequency independent and field-configurable.

4. The telecommunications system of claim 1, wherein the adjustable tuning elements are positioned between the at least one output port and a plurality of duplexers.

5. The telecommunications system of claim 1, further comprising:
   a controller communicatively coupled to the detectors and communicatively coupled to motors in the telecommunications system for causing the motors to automatically adjust the adjustable tuning elements based on the differences in the power level.

6. The telecommunications system of claim 5, further comprising:
   a display configured for providing a user interface for displaying the differences in power level between the input signals to the frequency combiner and the output signals from the frequency combiner.

7. The telecommunications system of claim 1, wherein each of the adjustable tuning elements is manually adjustable.

8. A remote unit of a distributed antenna system, the remote unit comprising:
   a frequency combiner including:
      input ports configured to receive signals at different frequencies from a head-end unit,
      at least one output port configured to output the signals to one or more user equipment devices; and
      a combiner component communicatively coupled between the input ports and the at least one output port, the combiner component having a detector, in each of at least one RF module, with circuitry for determining differences in power level between input signals to the frequency combiner and output signals from the frequency combiner, the combiner component having adjustable tuning elements, each adjustable tuning element being configured to adjust a signal-processing parameter of the frequency combiner while the frequency combiner is in the remote unit,
   wherein the remote unit is configured to provide wireless communication from the head-end unit to the one or more user equipment devices.

9. The remote unit of claim 8, wherein each adjustable tuning element is configured to adjust the signal-processing parameter by phase shifting or varying an electrical length of a transmission line.

10. The remote unit of claim 8, wherein the frequency combiner is frequency independent and field-configurable.

11. The remote unit of claim 8, wherein the adjustable tuning elements are positioned between the at least one output port and a plurality of duplexers.

12. The remote unit of claim 8, wherein the frequency combiner further includes:
    a controller communicatively coupled to the detector and communicatively coupled to motors for causing the motors to automatically adjust the adjustable tuning elements based on the differences in power level.

13. The remote unit of claim 12, wherein the frequency combiner further includes:
    a display configured for providing a user interface displaying the differences in power level between the input signals to the frequency combiner and the output signals from the frequency combiner.

14. The remote unit of claim 8, wherein each of the adjustable tuning elements is manually adjustable.

15. A method, comprising:
    receiving a plurality of signals at different frequencies;
    adjusting signal-processing parameters of a frequency combiner positioned between a plurality of input ports and an output port of a telecommunications system using adjustable tuning elements while the frequency combiner is in the telecommunications system;
    determining differences in power level between input signals to the frequency combiner and output signals from the frequency combiner; and
    outputting the plurality of signals.

16. The method of claim 15, wherein the signal-processing parameters comprise phase shifting or varying lengths of transmission lines, wherein the telecommunications system is a repeater or a distributed antenna system.

17. The method of claim 16, further comprising automatically adjusting the adjustable tuning elements based on the differences in the power level.

18. The method of claim 17, further comprising:
    displaying, on a display device, the differences in power level between the input signals to the frequency combiner and output signals from the frequency combiner.

19. The method of claim 15, wherein the adjustable tuning elements are adjusted manually.

20. The method of claim 15, wherein the received plurality of signals are received from a head-end unit of a distributed antenna system, and wherein the combined signals are transmitted to one or more user equipment devices.

* * * * *